C. HANSEN.
FRICTION CLUTCH.
APPLICATION FILED JUNE 6, 1914.

1,115,928.

Patented Nov. 3, 1914.
2 SHEETS—SHEET 1.

Witnesses:

Inventor,
Clifford Hansen,
By Dyrenforth, Lee, Chritton & Wiles,
Attys.

C. HANSEN.
FRICTION CLUTCH.
APPLICATION FILED JUNE 6, 1914.

1,115,928.

Patented Nov. 3, 1914.
2 SHEETS—SHEET 2.

Witnesses.

Inventor:
Clifford Hansen,

UNITED STATES PATENT OFFICE.

CLIFFORD HANSEN, OF TIFFIN, OHIO.

FRICTION-CLUTCH.

1,115,928.

Specification of Letters Patent.

Patented Nov. 3, 1914.

Application filed June 6, 1914. Serial No. 843,339.

*To all whom it may concern:*

Be it known that I, CLIFFORD HANSEN, a citizen of the United States, residing at Tiffin, in the county of Seneca and State of Ohio, have invented a new and useful Improvement in Friction-Clutches, of which the following is a specification.

My invention relates to an improvement in friction-clutches for use in transmitting power.

Figure 1:
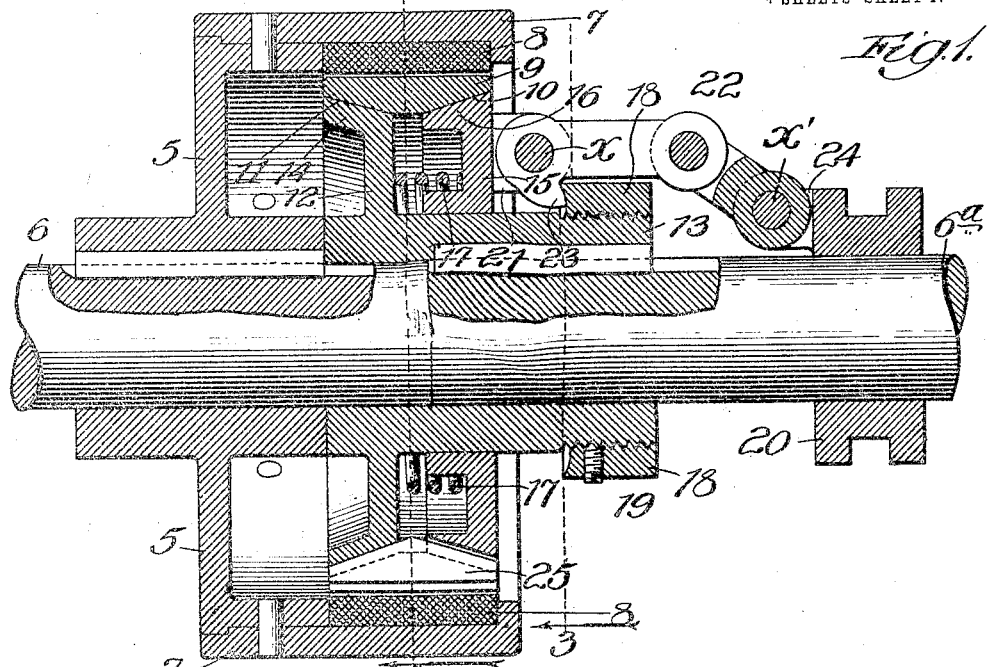
Figure 2:
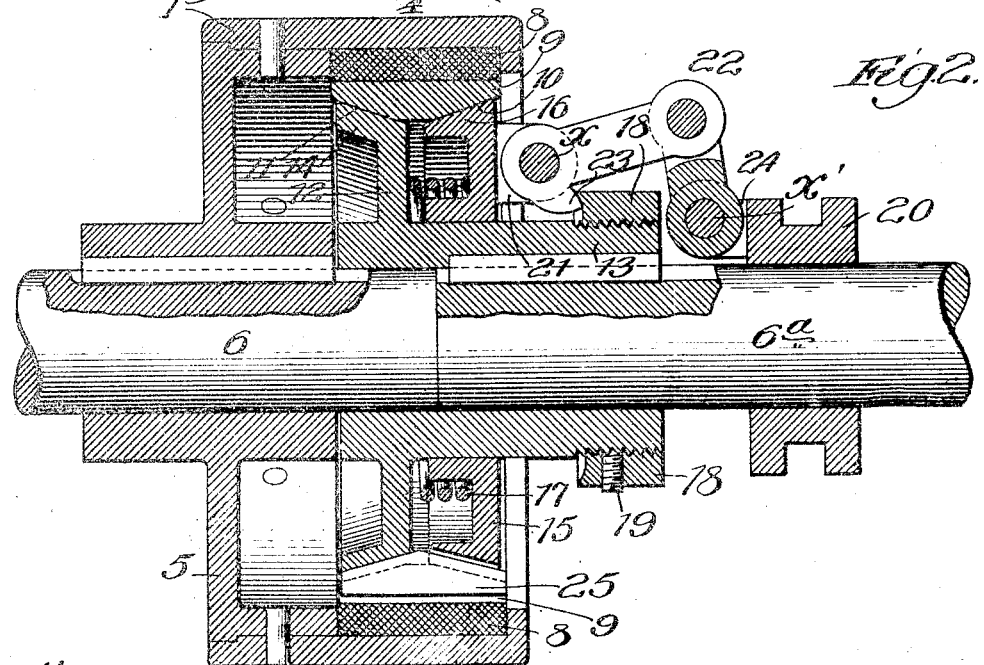
Figure 3:
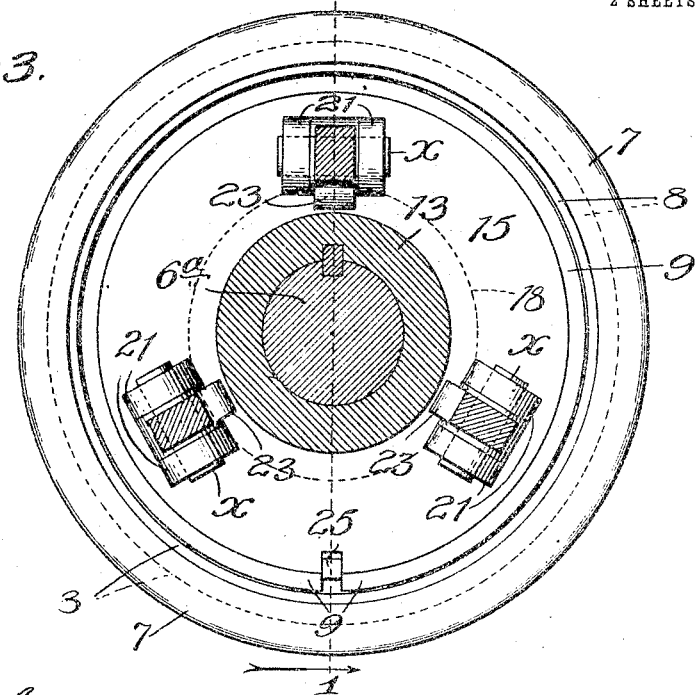
Figure 4:
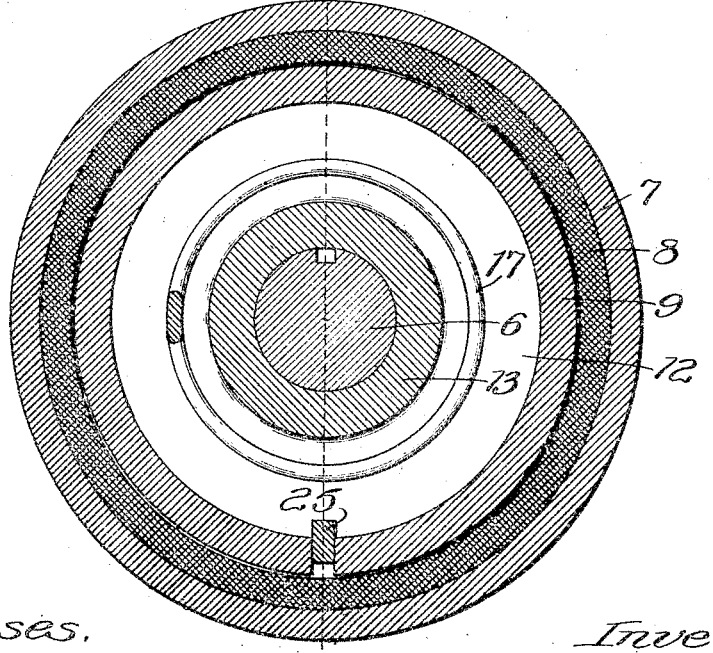

In the accompanying drawings, Figure 1 is a section on line 1, Fig. 3, of my improved friction-clutch in its unshipped condition and in operative position on a driving shaft and a driven shaft, shown broken away; Fig. 2 is a similar view showing the clutch in its shipped condition; Fig. 3 is a section on line 3, Fig. 1, and Fig. 4 is a section on line 4, Fig. 1.

A circular head 5, keyed at its hub to a drive-shaft 6, has pinned to it a cylinder 7. This cylinder is lined with material 8, preferably compressed paper, to afford a friction surface against which a split ring 9, of spring steel, forming the outer expansible clutch-member, is to be pressed as hereinafter described. The inner face of the ring presents beveled surfaces, as shown at 10 and 11, converging V-like in cross-section toward the circumferential center of the ring. An inner annular clutch-member 12 has a sleeve 13 keyed to a driven shaft $6^a$ and a circumferential web terminating in a head 14 conforming on its outer surface to the ring-surface 11 to operate wedgingly against the latter. A companion clutch-member 15, shown in the form of a hollow annulus, surrounds the sleeve 13 and is movable longitudinally thereon; and the outer circumferential surface of its head 16 conforms to the ring-surface 10. Between the members 12 and 15 may be interposed a spiral spring 17 tending to force apart these members and overcome any binding or sticking tendency thereof when released, as hereinafter explained, for unshipping the clutch; though the spring is a minor feature and may be entirely dispensed with. The outer end of the sleeve 13 is threaded and carries adjustably an abutment-nut 18, fastened in adjusted position by a set-screw 19 and having a concaved inner face. A circumferentially recessed collar 20 is supported on the driven shaft $6^a$ to be shifted along it, and is adapted to have a lever (not shown) applied to it in the recess, for shifting the collar. At intervals about the outer face of the clutch-member 15, ears 21 project in pairs through the open end of the cylinder. Each pair has pivotally connected with it the inner end of one link of a two-link toggle 22 provided with a cam-like tooth 23 engaging the concave face of the nut. This link is pivotally connected at its outer end with the adjacent end of the other toggle-link, which is pivoted at its opposite end between ears 24 projecting from the inner face of the collar 20. Each member 12 and 15 contains a transverse groove in its outer beveled face, and a key 25, of the contour shown, projects into these grooves and between the ends of the split expansion-ring to insure rotation of the latter with the adjacent clutch-members and prevent slipping of the latter against the ring.

To operate the clutch for coupling the shaft $6^a$ to the drive-shaft, the collar 20 is shifted from its position in Fig. 1 to that shown in Fig. 2, thereby bending the toggles and shortening the distance between the centers $x$ and $x'$, and forcing the tooth 23 against the nut, with the result of pulling outwardly the clutch-member 12 and forcing inwardly the clutch-member 15 and the effect of wedging the beveled surfaces of these members against the opposing surfaces 10 and 11 of the ring to expand it into frictional contact with the lining 8 and thus clutch the shafts together. Shifting the collar in the opposite direction straightens the toggles into the condition of that shown in Fig. 1 with resultant separation of the members 12 and 15 to unship the clutch.

Any wear between the engaging surfaces of the nut and the tooth may be readily compensated for by adjusting the nut toward the tooth.

I realize that considerable variation is possible in the details of construction thus specifically shown and described, and I do not intend by illustrating a single specific or preferred embodiment of my invention to be limited thereto; my intention being, in the following claims, to claim protection upon all the novelty there may be in my invention as broadly as the state of the art will permit.

What I claim as new and desire to secure by Letters Patent is:—

1. In a friction-clutch, the combination of a cylinder provided with an inner friction-surface, an expansion-ring in the cylinder having its inner surface beveled to converge toward its circumferential center, clutch-members within said ring provided with beveled outer surfaces to engage, respectively, said beveled ring-surfaces, and means for simultaneously moving said clutch-members in relatively opposite directions for expanding said ring against said friction-surface.

2. In a friction-clutch, the combination of a cylinder provided with an inner friction-surface, an expansion-ring in the cylinder having its inner surface beveled to converge toward its circumferential center, clutch-members within said ring having a key-connection therewith between its ends and provided with beveled outer surfaces to engage, respectively, said beveled ring-surfaces, and toggle-mechanism for simultaneously moving said clutch-members in relatively opposite directions for expanding said ring against said friction-surface.

3. In a friction-clutch, the combination of a cylinder provided with an inner friction-surface, an expansion-ring in the cylinder having its inner surface beveled to converge toward its circumferential center, clutch-members within said ring provided with beveled outer surfaces to engage, respectively, with said beveled ring-surfaces, an abutment connected with the inner clutch-member, a collar, and a toggle connecting said collar and the outer clutch-member and provided on the inner end of one of its links with a tooth coöperating with said abutment.

4. In a friction-clutch, the combination of a cylinder provided with an inner friction-surface, an expansion-ring in the cylinder having its inner surface beveled to converge toward its circumferential center, inner and outer clutch-members within said ring provided with beveled outer surfaces to engage, respectively, with said beveled ring-surfaces, a sleeve carrying the inner clutch-member, a nut adjustably supported on said sleeve, a collar, and toggles connecting said collar and the outer clutch-member and provided on the ends of their inner links with teeth coöperating with the inner face of the nut.

5. In a friction-clutch, the combination of a cylinder provided with an inner friction-surface, an expansion-ring in the cylinder having its inner surface beveled to converge toward its circumferential center, inner and outer clutch-members within said ring provided with beveled outer surfaces to engage, respectively, with said beveled ring-surfaces, a threaded sleeve carrying the inner clutch-member, a nut on said sleeve having a concave inner surface, a collar, and toggles connecting said collar and the outer clutch-member and provided on their inner links with cam-like teeth engaging said concave nut-face.

CLIFFORD HANSEN.

In presence of—
  F. E. M. BALDWIN,
  W. F. NOBLE.